(12) United States Patent
Sakai et al.

(10) Patent No.: US 6,334,914 B2
(45) Date of Patent: Jan. 1, 2002

(54) COPPER ALLOY SLIDING MATERIAL

(75) Inventors: Kenji Sakai; Naohisa Kawakami; Satoru Kurimoto; Takashi Inaba; Koichi Yamamoto; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/749,442

(22) Filed: Dec. 28, 2000

(30) Foreign Application Priority Data

Feb. 29, 2000 (JP) ............................................. 12-053798

(51) Int. Cl.[7] ............................... C22C 9/02; F16C 33/12
(52) U.S. Cl. ........................... 148/433; 75/237; 75/240; 75/247; 428/545
(58) Field of Search .......................... 148/433, 435, 148/434; 420/485, 487; 428/545; 75/235, 237, 240, 247

(56) References Cited

U.S. PATENT DOCUMENTS

| | | |
|---|---|---|
| 5,089,354 A | 2/1992 | Nakashima et al. |
| 5,303,617 A | 4/1994 | Asada et al. |
| 5,938,864 A | * 8/1999 | Tomikawa et al. .......... 148/435 |

FOREIGN PATENT DOCUMENTS

| | | |
|---|---|---|
| GB | 596626 | 1/1948 |
| GB | 1 456 644 | 11/1973 |
| JP | 62 80242 | 4/1987 |
| JP | 2118002 | 5/1990 |
| JP | 4 335 | 1/1992 |
| JP | 04000335 | * 1/1992 |
| JP | 11293368 | 10/1999 |

\* cited by examiner

*Primary Examiner*—Sikyin Ip
(74) *Attorney, Agent, or Firm*—Browdy and Neimark

(57) ABSTRACT

Disclosed is a copper alloy sliding material comprising 0.5 to 15 mass % Sn and 0.1 to 10 vol % of hard particles consisting of one or more selected from WC, $W_2C$ and $Mo_2C$. The hard particles have preferably an average particle size of 0.1 to 10 $\mu$m, whereby they are dispersed in the copper alloy matrix so as to make the sliding-contact surface uneven, from which the hard particles protrude partially. The sliding material comprises an amount or a total amount of not more than 40 mass % of one or more selected from Ni, Ag, Fe, Al, Zn, Mn, Co, Si and P, an amount or a total amount of not more than 10 mass % of Bi and/or Pb, and/or an amount or a total amount of not more than 10 vol % of a solid lubricant comprising BN, graphite, $MoS_2$ and/or $WS_2$.

8 Claims, 3 Drawing Sheets

COPPER ALLOY SLIDING MATERIAL

BACKGROUND OF THE INVENTION

1. Field of the Invention

The present invention relates to a copper alloy sliding material, more particularly to the copper alloy sliding material which is suitable to a sintering alloy bearing including a plain bearing.

2. Brief Description of the Art

In general, the Kelmet alloy (i.e. a Cu—Pb system or a Cu—Sn—Pb system) is used for a copper alloy sliding material, for example a sintering copper alloy for plain bearings. It has been known that the Kelmet material has excellent anti-seizure property and exhibits good sliding property under a hydrodynamic lubrication condition by virtue of a much content of Pb (i.e. about 20 mass %). Recently, however, it has been desired for various metal materials not to contain Pb as far as possible from the view point of protecting the environment.

BRIEF SUMMARY OF THE INVENTION

The present invention has been developed under the above background and is aimed to provide the copper alloy sliding material which can ensure a high performance of anti-seizure property while reducing the Pb content.

With regard to the copper alloy sliding material, there may be an idea of dispersing hard particles in the copper based matrix (e.g. Cu—Sn), the hard particles being much harder than the matrix. In general, the hard particles may be of a metal system material such as Mo or W, or of a ceramic system material such as $SiO_2$, $Al_2O_3$ or SiC.

In this case, the following function or effects can be expected:

(1) Since the hard particles much harder than the copper based matrix are dispersed on the surface (i.e. sliding-contact surface), the copper alloy sliding material will have good sliding-contact property and excellent wear resistance.

(2) The hard particles will protrude from the surface so as to form recessions with relation to the matrix, so that the oil retaining property and anti-seizure property will be improved.

(3) The hard particles will make the surface of a mating shaft smooth to improve the anti-seizure property.

(4) Although there is a fear that the copper based matrix will partially move to the surface of the mating shaft (usually, steel) due to adhesion to deteriorate the anti-seizure property, the hard particles will shave off adhesives of the copper alloy from the mating shaft to contribute to improvement of the anti-seizure property and a long life of the mating shaft.

However, because the metal system hard particles consisting of Mo or W have a lower hardness (which is not more than 500 of Vickers Hardness) than the ceramic system hard particles, they are inferior in the effect of shaving off adhesives of the copper alloy from the mating shaft. There is also a problem that metals such as Mo or W are comparatively adhesive to steel (Fe) of the mating shaft as compared with ceramics because of the metal to metal sliding-contact. In contrast, the ceramic system hard particles such as $SiO_2$, $Al_2O_3$ or SiC are excellent in the effect of shaving off adhesives of the copper alloy from the mating shaft because of higher hardness (for example, 600 to 700 of Vickers Hardness) than the mating shaft and do not adhere to the mating shaft because they are hard to form intermetallic compounds with metals such as steel (Fe).

However, in the case where the ceramic system hard particles such as $SiO_2$, $Al_2O_3$ or SiC are selected, there have been a problem that, when the sliding contact material receives a dynamic load, since the protruded hard particles support the load, cracks arise at the interface between the copper system matrix and the hard particles due to shear stress arisen at the interface resulting in a phenomenon of falling-off of the hard particles from the copper system matrix. If such falling-off of the hard particles occurs, the abrasive wear arises resulting in deterioration of anti-seizure property. Further, when such falling-off of hard particles arises, voids (or recessions) are produced to become trigger points of fatigue due to stress concentration resulting in deteriorated fatigue resistance. The factor that hard particles such as $SiO_2$, $Al_2O_3$ or SiC are liable to fall off from the matrix will reside in low wettability by copper (or a copper alloy).

Thus, the present inventors practiced various experiments and researches in order to solve the falling-off problem of the hard particles while ensuring the effect in virtue of the hard particles, whereby it has been confirmed that the wettability of the hard particles by the copper alloy matrix is improved to make them hard to leave from the matrix by using WC, $W_2C$ and/or $Mo_2C$ as the hard particles instead of usual $SiO_2$, $Al_2O_3$ or SiC, consequently the present invention has been achieved.

The invention copper alloy sliding material comprises 0.5 to 15 mass % Sn and 0.1 to 10 vol % of hard particles consisting of one or more selected from WC, $W_2C$ and $Mo_2C$. The content of the hard particles is defined not with the mass percent but with the volume percent, being more proper than the former unit which varies with the specific gravity of the hard particles, because a volume of the hard particles is important with regard to the function thereof. This is the same in the case of a solid lubricant mentioned below.

According to the copper alloy sliding material in which the hard particles with a high hardness are dispersed, excellent anti-seizure and fatigue resistance properties can be obtained while reducing the Pb amount. Since the hard particles consisting of one or more selected from WC, $W_2C$ and $Mo_2C$ have a high hardness (i.e. not less than 1300 of Vickers Hardness), they are excellent in the effect of shaving off adhesives of the copper alloy from the mating shaft and do not adhere to the mating shaft because they are hard to form intermetallic compounds with metals such as steel (Fe). Further, the hard particles consisting of one or more selected from WC, $W_2C$ and $Mo_2C$ have good wettability by the copper alloy contrasting with $SiO_2$, $Al_2O_3$ or SiC, so that it is possible to prevent them to fall off from the copper alloy matrix.

The defined amount of Sn being 0.5 to 0.15 mass % can strengthen the copper alloy matrix to improve the fatigue resistance. If the Sn amount is less than 0.5 mass %, there can not be seen the effect of strengthening the copper alloy matrix. If the Sn amount exceeds 15 mass %, a much amount of Cu—Sn system intermetallic compounds is produced to become brittle disadvantageously.

The amount of the hard particles are required to be 0.1 to 10 volume %. If it is less than 0.1 volume %, the desired improvement in anti-seizure and wear resistance properties can not be obtained. If it exceeds 10 volume %, the strength is deteriorated to be lower fatigue resistance and an attacking intensity of the hard particles against the mating shaft becomes too great, so that there can not be seen the improvement effect of anti-seizure and wear resistance properties. More preferably, the amount of the hard particles is 0.5 to 5 volume %.

The hard particles have preferably an average particle size of 0.1 to 10 μm. If the average particle size is less than 0.1 μm, the hard particles are too fine, so that there can not be appeared improvement of anti-seizure and wear resistance properties as an elemental hard particle. If the average particle size exceeds 10 μm, an attacking intensity of the hard particles against the mating shaft increases resulting in deterioration of workability including machinability. More preferably, the average particle size is within a range of 1 to 5 μm.

The copper alloy may comprise an amount or a total amount of not more than 40 mass % of one or more selected from Ni, Ag, Fe, Al, Zn, Mn, Co, Si and P (phosphorous). The alloying element(s) strengthens the copper alloy matrix to improve the fatigue resistance of the copper alloy. If the amount of the alloying element(s) exceeds 40 mass %, the copper alloy matrix becomes too hard to apply the alloy material to bearings. Therefore, the amount or the total amount of the alloying element(s) is preferably not more than 40 mass %.

The copper alloy may also comprise an amount or a total amount of not more than 10 mass % of Bi and/or Pb. In this case, a soft Bi and/or Pb phase is formed in the copper alloy matrix to improve conformability, foreign substance embeddability and anti-seizure property of the copper alloy. If the amount of Bi and/or Pb exceeds 10 mass %, the strength of the copper alloy is deteriorated. Therefore, the amount of Bi and/or Pb is suitably not more than 10 mass %. With regard to Pb, while its amount is desirably as small as possible (for example, zero percent), it is possible to achieve the object of the invention, which is to fully reduce the Pb content in the copper alloy relative to the conventional the Kelmet alloy (comprising about 20 mass % Pb), by the defined amount of Pb.

The copper alloy may also comprise an amount or a total amount of not more than 10 vol % of a solid lubricant comprising BN, graphite, $MOS_2$ and/or $WS_2$. The solid lubricant can improve the self lubrication property of the copper alloy, so that the anti-seizure and wear resistance properties of the copper alloy can be further improved. If the amount of the solid lubricant exceeds 10 vol %, the strength of the copper alloy is deteriorated. Thus, the amount of the solid lubricant is properly of not more than 10 vol %.

Figure 1:
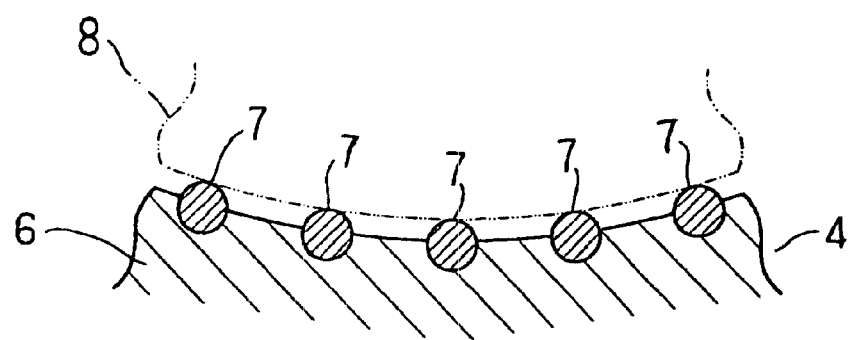
FIG. 1 is a schematic cross-sectional view around the inner surface of a plain bearing as one embodiment of the invention.

BRIEF DESCRIPTION OF PREFERRED
EMBODIMENTS OF THE PRESENT
INVENTION

Herein below, referring to the drawings, an embodiment of the invention will be described with respect to a plain bearing.

Figure 2:
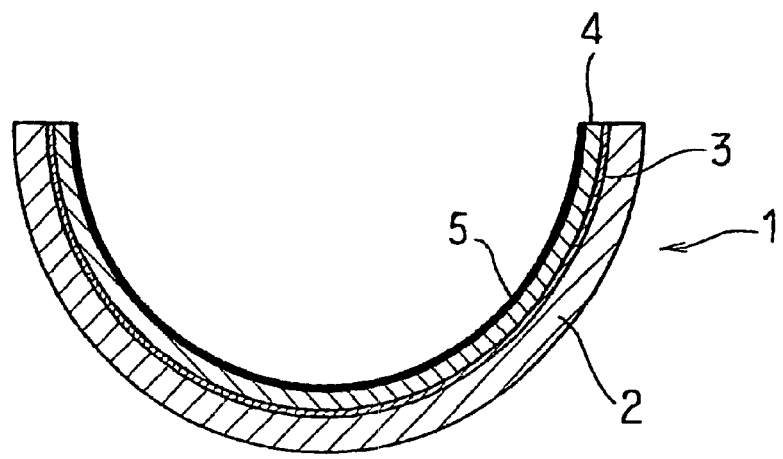
FIG. 2 is a cross-sectional view showing a structure of a plain bearing according to the invention.

FIG. 2 shows schematically a structure of plain bearing 1 according to the invention. The plain bearing 1 is a so-called hemi-circular bearing half, a pair of which are combined cylindrically in use. The plain bearing 1 consists of a back metal 2 made of a thin steel plate, a copper alloy sliding material layer 4 of the invention, which is provided on the inner surface of the back metal 2 optionally via a copper plating layer 3 as a bonding layer, and an overlay layer 5 which is provided on the copper alloy sliding material layer 4 and made of a soft metal or resin.

The copper alloy sliding material layer 4 is of a copper system sintering alloy having a chemical composition as defined in the claims, for example, those of invention examples 1 to 9 described hereafter. Namely, the copper alloy sliding material layer 4 has a chemical composition of 0.5 to 15 mass % Sn and 0.1 to 10 vol % of hard particles consisting of one or more selected from WC, $W_2C$ and $Mo_2C$. The hard particles have an average particle size of 0.1 to 10 μm.

Preferably, the copper alloy sliding material layer 4 comprises an amount or a total amount of not more than 40 mass % of one or more selected from Ni, Ag, Fe, Al, Zn, Mn, Co, Si and P. It may also comprise an amount or a total amount of not more than 10 mass % of Bi and/or Pb. It may also comprise an amount or a total amount of not more than 10 vol % of a solid lubricant comprising BN (especially, h-BN), graphite, $MoS_2$ and/or $WS_2$.

Here, a brief description will described on a method of producing the plain bearing 1.

(1) First, a copper alloy powder (Cu—Sn), having a predetermined chemical composition, and hard particles are mixed in a mixing machine so as to have a predetermined proportion (i.e. 0.1 to 10 vol % of the hard particles). Preferably, the copper alloy powder consists of particles each having a particle size of not more than 250 μm. The copper alloy powder may comprise also an alloying element(s) in a predetermined proportion, which is one or more of Ni, Ag, Fe, Al, Zn, Mn, Co, Si and P, and/or one or more of Bi and Pb. The copper alloy powder may comprise also a predetermined amount of BN, graphite, $MoS_2$ and/or $WS_2$ in addition to the hard particles. Further, the copper alloy powder is not always required to be of a previously alloyed powder but may be a mixture of powders each consists of an alloying element.

(2) Next, the thus prepared powder mixture is spread uniformly on a steel plate (i.e. a back metal 2) being provided with a copper plating layer 3 thereon and having a thickness of 1.3 mm, for example. The steel plate with the powder mixture is heated to 800 to 920° C. of temperature for about 15 minutes in a reduction atmosphere in order to perform a first sintering treatment. The sintered steel plate is subjected to rolling. In order to further increase the density of the sintered layer on the steel plate, a further process of desired times of sintering and subsequent rolling is repeated, so that a bimetal plate, which consists of the steel plate (back metal 2) and the sintered copper alloy layer (i.e. the copper alloy sliding material layer 4) and in which the sintered copper alloy layer is 0.4 mm thick and the total thickness is 1.6 mm, for example, can be obtained. The bimetal plate is subjected to a machine working thereby shearing to a predetermined measurement, bending to a hemi-circular shape and finish-machining its surface. Thereafter, an overlay layer is provided on the sintered copper alloy layer whereby the plain bearing 1 produced.

Referring to FIG. 1 which is a schematic cross-sectional view around the inner surface of the plain bearing 1 while omitting the overlay layer 5, there are dispersed hard particles 7, consisting of WC, $W_2C$ and/or $Mo_2C$ and having a high hardness (i.e. not less than 1300 of Vickers Hardness), in the copper alloy matrix 6. Microscopically looking at the inner surface state of the plain bearing 1, the hard particles 7 protrude from the surface (i.e. the sliding surface) so as to form an uneven surface with respect to the copper alloy matrix 6.

While the thus structured plain bearing 1 supports the mating shaft 8 of a crank shaft of motor vehicle engines, for example, on its inner surface, the partially protruded hard particles 7 of the copper alloy sliding material layer 4 receive the load from the mating shaft 8. Further, while lubricant oil is supplied to the sliding-contact surface of the bearing, recessions at the uneven surface, which are present under the relationship between the protruded hard particles 7 and the copper alloy matrix 6, act as oil reservoirs to improve the oil retaining capacity of the plain bearing 1.

Experiment

In order to inspect and confirm the effectiveness of the copper alloy sliding material layer 4, the inventors performed a seizure test and a fatigue test for examining anti-seizure property and fatigue resistance with regard to specimen materials of Example Nos. 1 to 9 and Comparative Example Nos. 1 to 4 of which chemical compositions are shown in Table 1.

TABLE 1

|  | | COMPONENTS | | | | | | *H.P. |
| --- | --- | --- | --- | --- | --- | --- | --- | --- |
|  | | mass % | | | | | volume % | Size |
|  | No | CU | Sn | Ni | Bi | Pb | Gr. | H.P. | ($\mu$m) |
| INVENTION | 1 | Bal. | 10 | — | — | — | — | WC:1.5 | 1.5 |
| EXAMPLE | 2 | Bal. | 6 | 1.5 | — | — | — | WC:2 | 1.5 |
|  | 3 | Bal. | 6 | 7 | — | — | — | WC:1 | 5 |
|  | 4 | Bal. | 6 | — | — | — | — | Mo$_2$C:1 | 2 |
|  | 5 | Bal. | 2 | 3 | — | — | — | Mo$_2$C:2 | 2 |
|  | 6 | Bal. | 2 | — | 5 | — | — | WC:5 | 5 |
|  | 7 | Bal. | 2 | — | — | — | — | WC1.5 | 1.5 |
|  | 8 | Bal. | 10 | 3 | — | — | — | WC:7 | 5 |
|  | 9 | Bal. | 10 | — | — | — | 1.5 | Mo$_2$C:4 | 4 |
| COMPARA- | 1 | Bal. | 3.5 | — | — | 23 | — | — | — |
| TIVE | 2 | Bal. | 6 | 1.5 | — | — | — | WC:15 | 1.5 |
| EXAMPLE | 3 | Bal. | 6 | — | — | — | — | — | — |
|  | 4 | Bal. | 6 | — | — | — | — | Al$_2$O$_3$:1 | 2 |

*Note: "H.P. Size" means "an average particle size of hard particles".

The seizure test was carried out as follows.

Bearings were prepared by the same process as that of the bearing 1 shown in FIG. 2, of which copper alloy sliding material layers have the chemical compositions of Invention Example Nos. 1 to 9 and Comparative Example Nos. 1 to 4, respectively. However, the respective bearing was not provided with an overlay layer in order to clearly confirm characteristics of the copper alloy sliding material layer.

A rotary shaft, which was driven by an electric motor, was supported by the respective bearing.

TEST CONDITIONS

At first a running-in operation was conducted for 60 minutes.

Thereafter, the bearing load was increased step-by-step from a given initial bearing load in such a manner that 5 MPa was accumulated every 10 minutes.

Continuously rotating the rotary shaft and increasing the bearing load as stated above, a bearing load just prior to the bearing load, when the temperature of the bearing back surface exceeded 220° C. or there arose an abnormal driving current of the electric motor which drives the shaft, was determined as a maximum specific load without seizure.

Other test conditions are shown in following Table 2.

TABLE 2

| ITEM | CONDITION |
| --- | --- |
| SHAFT DIAMETER | 53 mm |
| BEARING WIDTH | 13 mm |
| PERIPHERAL SPEED OF SHAFT | 10 m/second |
| LUBRICANT OIL | SAE #20 |
| OIL SUPPLY AMOUNT | 12.5 ml/minute |
| MATERIAL OF SHAFT | JIS S55C as quenched |
| SHAFT SURFACE ROUGHNESS | Rmax: not more than 1.0 $\mu$m |

The fatigue test was carried out as follows.

Bimetal plates were prepared by the same process as afore mentioned, of which copper alloy sliding material layers have the chemical compositions of Invention Example Nos. 1 to 9 and Comparative Example Nos. 1 to 4, respectively. A back metal was removed from the respective bimetal plate by machining to obtain a specimen.

A testing load was exerted on the thus obtained every specimen under room temperature to examine fatigue property. The testing load was increased step-by-step from an initial load of 50 MPa in such a manner that 10 MPa was accumulated at every increase of load. Applying the testing load cyclically and sine-curvedly 50,000 times to the respective specimen at every testing load level, a testing load value when there arose a crack in the specimen was determined as the fatigue rupture load.

Figure 3:
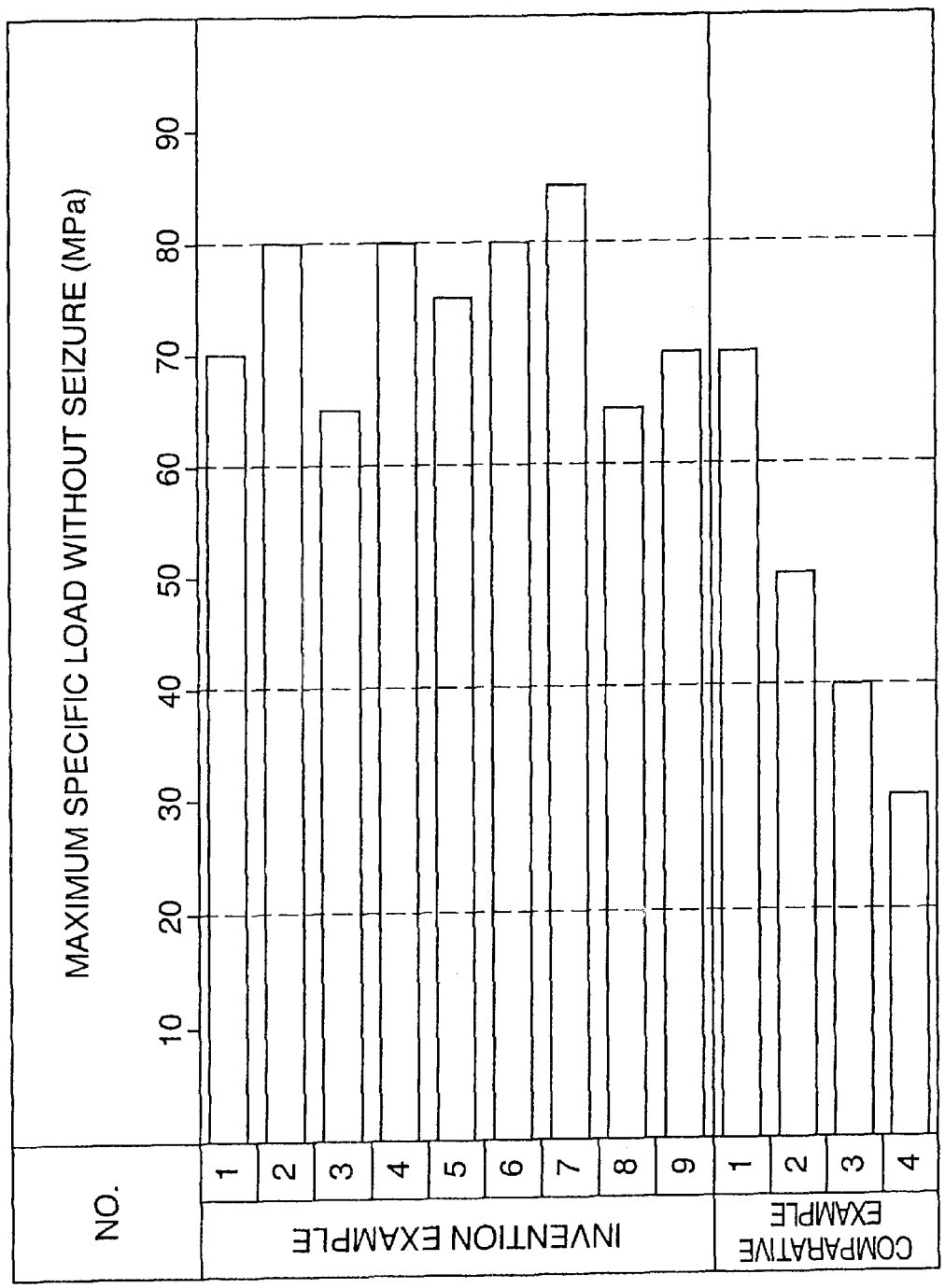
FIG. 3 is a graph which shows results of a seizure test on Invention and Comparative Examples.
Figure 4:
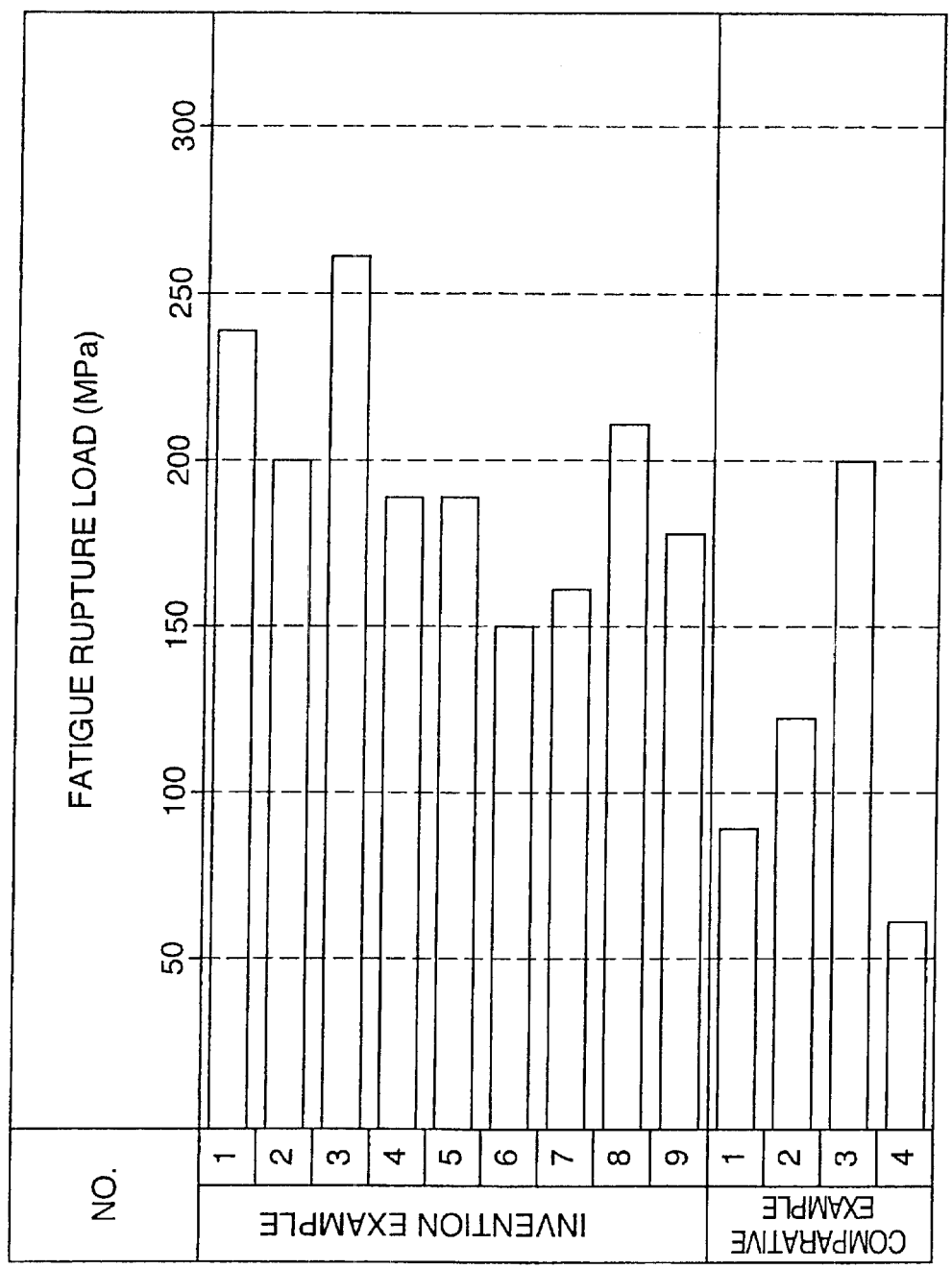
FIG. 4 is a graph which shows results of a fatigue test on Invention and Comparative Examples.

FIGS. 3 and 4 show the results of the seizure test and the fatigue test, respectively.

A consideration on the test results will be provided below.

First, comparing Comparative Example No. 1, which is of the Kelmet material comprising a lot of Pb which has been generally used in conventional plain bearings, with the other Examples which comprise WC and/or Mo$_2$C of the hard particles 7, with regard to the anti-seizure property (i.e. the maximum specific load without seizure), the all Invention Example Nos. 1 to 9 are generally the same or superior than Comparative Example No. 1. With regard to the fatigue rupture load, the all Invention Examples 1 to 9 are significantly improved as compared with Comparative Example No. 1. Regarding the anti-seizure property, Comparative Example No. 3 is notably inferior than Invention Example No. 4, the former comprising substantially the same chemical composition as that of the latter except for the component of the hard particles 7.

From the results, it is believed that the high anti-seizure property could be obtained because the hard particles 7, having a high hardness and being dispersed in the copper alloy matrix 6, well acted with respect to the anti-seizure property. The following four points could be raised as functions of the hard particles 7.

(1) By virtue of the hard particles 7 having a high hardness present at the surface (i.e. the sliding-contact surface) of the copper alloy sliding material layer 4, the sliding-contact property of the plain bearing is improved so as to have excellent wear resistance property.

(2) By virtue of the hard particles 7 partially protruded from the surface of the copper alloy sliding material layer 4, recessions at the surface, which are present under the relationship between the protruded hard particles 7 and the copper alloy matrix 6, act as oil reservoirs to improve the oil retaining capacity resulting in improved anti-seizure property of the plain bearing 1.

(3) The hard particles 7 make the surface of the mating shaft smooth so as to improve the anti-seizure property.

(4) Although there is a fear that the copper alloy matrix 6 will partially move to the surface of the mating shaft (usually, steel) 8 due to adhesion to deteriorate the anti-seizure property, the hard particles 7 shave off adhesives of the copper alloy from the mating shaft 8 to contribute to improvement of the anti-seizure property and a long life of the mating shaft 8. Because of a high hardness (i.e. not less than 1300 of Vickers Hardness), the ceramic system hard particles 7 of WC, $W_2C$ and/or $Mo_2C$ have excellent performance of shaving off adhesions of the copper alloy from the mating shaft 8. Also there is not adhesion with the mating shaft 8 because the ceramic system hard particles are hard to form an intermetallic compound with steel (or Fe).

Comparing Comparative Example No. 2 with Invention Example No. 2 both of which contain the hard particles (WC), Comparative Example No. 2, which comprises 15 vol % of the hard particles, is extremely inferior in both of the anti-seizure and fatigue resistance properties than Invention Example No. 2 which comprises 2 vol % of the hard particles. It is noted also that Comparative Example No. 2 is inferior in the anti-seizure and fatigue resistance properties than all Invention Examples.

This will be because a too much amount of the hard particles 7 makes the copper alloy to have low strength so as to be deteriorated in fatigue resistance property and to have too great attacking intensity against the mating shaft 8 resulting in that the hard particles is no more effective for improving the anti-seizure and wear resistance properties. According to a research by the present inventors, a proper amount of the hard particles 7 is within a range of 0.1 to 10 vol %, more preferably 0.5 to 5 vol %.

Comparing Comparative Example No. 4, which contains the ceramic system hard particles of $Al_2O_3$, with Invention Example No. 4 which comprises the same metal base (i.e. the copper alloy matrix 6) with the former Example and the hard particles of $Mo_2C$, the former is extremely inferior in the anti-seizure and fatigue resistance properties than the latter.

This will be because, in the case where the ceramic system hard particles such as $SiO_2$, $Al_2O_3$ or SiC are selected, there is a problem that, when the sliding contact material receives a dynamic load, since $Al_2O_3$ has low wettability by copper (or a copper alloy), cracks are liable to arise at the interface between the copper system matrix and the hard particles due to shear stress arisen at the interface resulting in a phenomenon of falling off of the hard particles from the copper system matrix. If such falling off of the hard particles occurs, the abrasive wear arises resulting in deterioration of anti-seizure property, and furthermore when such separation of hard particles arises, voids (or recessions) are produced to become trigger points of fatigue due to stress concentration resulting in deteriorated fatigue resistance. In contrast, the hard particles 7 of WC and $Mo_2C$ being contained in Invention Examples are hard to fall off from the copper alloy matrix 6 because of good wettability by a copper alloy.

Reviewing the Invention Examples, Example No. 3 containing 7 mass % of Ni has the highest fatigue resistance property. This will be because the copper alloy matrix 6 was strengthened by Ni dissolved therein. Example No. 6 containing 5 mass % of Bi has high anti-seizure property. This will be because a soft Bi phase was formed in the copper alloy matrix 6 so as to improve the conformability, foreign substance embeddability and anti-seizure property.

As will be apparent from the above, according to the invention copper alloy sliding material, it is possible to ensure a high performance of the anti-seizure and fatigue resistance properties while reducing the Pb content. Consequently, the high utility copper alloy sliding material can be provided as an alternative of the conventional Kelmet material.

While the copper alloy sliding materials of the embodiment Invention Examples do not comprise Pb, the invention material may comprise a small amount of Pb (i.e. not more than 10 mass %). Even in this case, it is possible to achieve the object of fully reducing the Pb amount as compared with the conventional Kelmet material (comprising about 20 mass % Pb). The hard particles may be a combination of two or more of WC, $W_2C$ and $Mo_2C$. The present invention can be practiced under various modifications or alternatives within a scope of the claim definition, more specifically, the invention copper alloy sliding material can be applied to not only plain bearings but also various types of sliding material.

What is claimed is:

1. A copper alloy sliding material consisting essentially of 0.5 to 15 mass % Sn;
    an amount or a total amount of a solid lubricant comprising BN, graphite, $MoS_2$, and/or $WS_2$, said amount or total amount being from effective amount to improve anti-seizure and wear resistance properties of the copper alloy to amount not more than 10 vol %
    one or more elements selected from the group consisting of Ni, Ag, Fe, Al, Zn, Mn, Co, Si and P (phosphorous), said one or more elements being present in a total amount no greater then 40 mass %; and
    0.1 to 10 vol % of $Mo_2C$ hard particles, wherein the hard particles have an average particle size of 0.1 to 10 µm and the balance of being Cu and inevitable impurities.

2. A copper alloy sliding material according to claim 1, which further comprises one or both of Bi and Pb, said Bi and Pb being present in an amount or total amount of not more than 10% mass.

3. A copper alloy sliding material consisting essentially of 0.5 to 15 mass % Sn;
    an amount or a total amount of a solid lubricant comprising BN, graphite, $MoS_2$, and/or $WS_2$, said amount or total amount being from effective amount to improve anti-seizure and wear resistance properties of the copper alloy to amount not more than 10 vol %;
    one or more elements selected from the group consisting of Fe, Al, Zn, Mn, Co, Si and P (phosphorous), said one or more elements being present in a total amount no greater then 40 mass %; and
    0.1 to 10 vol % of $Mo_2C$ hard particles wherein the hard particles have an average particle size of 0.1 to 10 µm and the balance of being Cu and inevitable impurities.

4. A copper alloy sliding material according to claim 3 which further comprises one or both of Bi and Pb, said one or both of Bi and Pb being present in an amount or a total amount of not more than 10 mass %.

5. In a plain bearing having a convex surface and a concave surface, comprising a back metal and a copper alloy sliding material layer along the concave surface of said back metal, the improvement wherein
    said copper alloy sliding material layer consists of copper, 0.5 to 15 mass % Sn and 0.1 to 10 vol % of $Mo_2C$ hard particles,
    optionally at least one of Bi and Pb in amount of up to 10 mass %,
    a solid lubricant comprising at least one of BN, graphite, $MoS_2$ and $WS_2$ in a total amount of effective to improve anti-seizure and wear resistance properties of the copper alloy to not more than 10 vol %, and optionally at least of the elements selected from the group consisting of Ni, Ag, Fe, Al, Zn, Mn, Co, Si and P (phosphorous), said at least one of the elements being present in an amount or total amount no greater than 40% and the balance of being Cu and inevitable impurities.

6. The bearing of claim 5, wherein at least one of said Bi and Pb is or are present.

7. A copper alloy sliding material consisting essentially of 0.5 to 15 mass % Sn;

an amount or a total amount of a solid lubricant comprising BN, graphite, $MoS_2$, and/or $WS_2$, said amount or total amount being from effective amount to improve anti-seizure and wear resistance properties of the copper alloy to amount not more than 10 vol % ;

an amount or a total amount of not more than 40 mass % of one or more selected from the group consisting of Ni, Fe, Al, Zn, Mn, Co, Si and P (phosphorous); and 0.1 to 10 vol % of hard particles of $Mo_2C$, wherein the hard particles have an average particle size of 0.1 to 10 $\mu$m and the balance of being Cu and inevitable impurities.

8. A copper alloy sliding material consisting essentially of:

0.5 to 15 mass % Sn;

one or more selected from the group consisting of Ni, Fe, Al, Zn, Mn, Co, Si and P (phosphorous), said one or more elements being present in an amount or total amount of not more than 40 mass %, Bi and/or Pb, said one or both of Bi and Pb being present in an amount or total amount of not more than 10 mass %, a lubricant consisting of one or more solid lubricants selected from the group consisting of BN, graphite, $MoS_2$ and $WS_2$, said one or more solid lubricant being present in an amount or total amount of effective to improve anti-seizure and wear resistance properties of the copper alloy to not more than 10 vol %, and 0.1 to 10 vol % of hard particles of $Mo_2C$, wherein the hard particles have an average particle size of 0.1 to 10 $\mu$m and the balance of being Cu and inevitable impurities.

* * * * *